United States Patent [19]

Hettel et al.

[11] Patent Number: 5,056,589

[45] Date of Patent: Oct. 15, 1991

[54] SUPERCOOLED LIQUID THERMAL GENERATOR AND IMPROVED TRIGGERING DEVICE

[76] Inventors: Bernd R. Hettel, 3881 W. 6th St., Los Angeles, Calif. 90020; Jay E. Philippbar, 33815 Castano Dr. Bldg. A, Dana Point, Calif. 92629

[21] Appl. No.: 452,808

[22] Filed: Dec. 19, 1989

[51] Int. Cl.⁵ .............................................. F28D 20/00
[52] U.S. Cl. ...................................... 165/10; 126/263
[58] Field of Search ....................... 126/263; 165/10 A

[56] References Cited

U.S. PATENT DOCUMENTS 4,532,110 7/1985 Kapralis .............................. 126/263
4,829,980 5/1989 Smith .................................. 126/263

Primary Examiner—Albert W. Davis, Jr.

[57] ABSTRACT

A self-contained manually triggerable thermal energy pack includes a flexible enclosure containing a supercooled solution capable of being triggered to begin crystallization and a triggering structure including a single close turn helical metallic spring having sufficient stiffness to maintain its cylindrical shape and sufficient resiliency to allow bending by the application of manual pressure normal to its axis.

12 Claims, 3 Drawing Sheets

FIG. 1
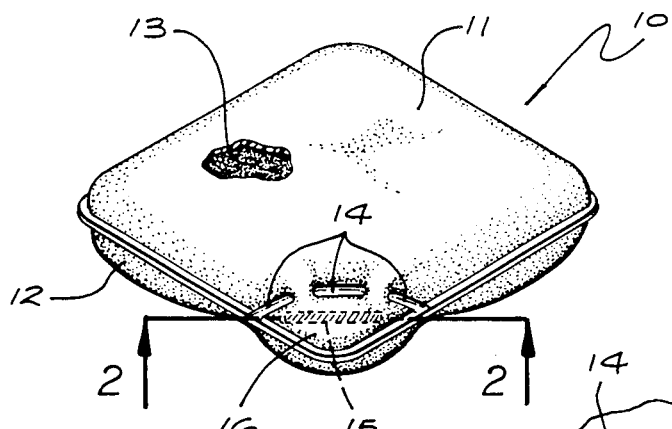
FIG. 2
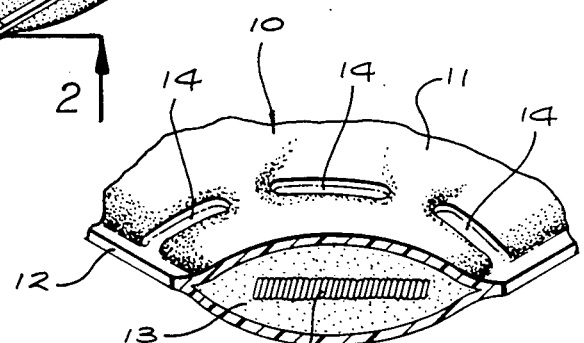
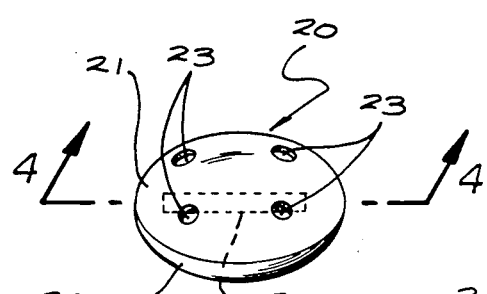
FIG. 3
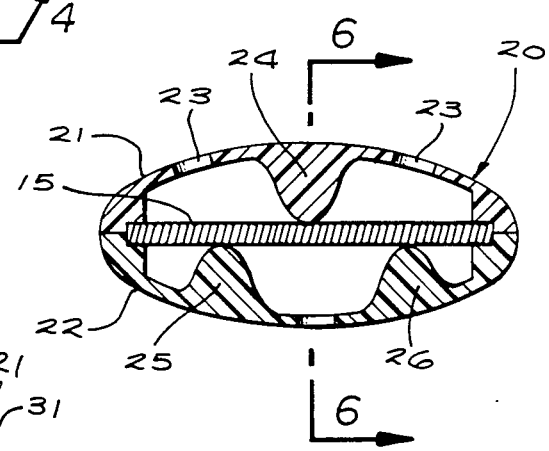
FIG. 4
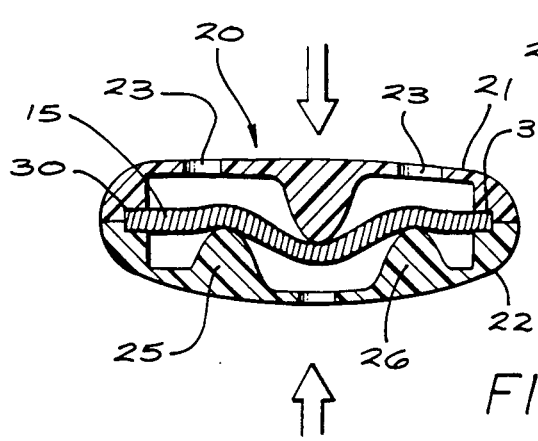
FIG. 5

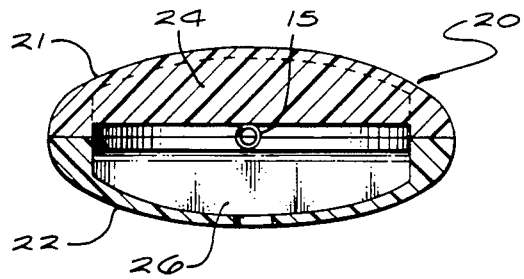
FIG. 6
FIG. 7
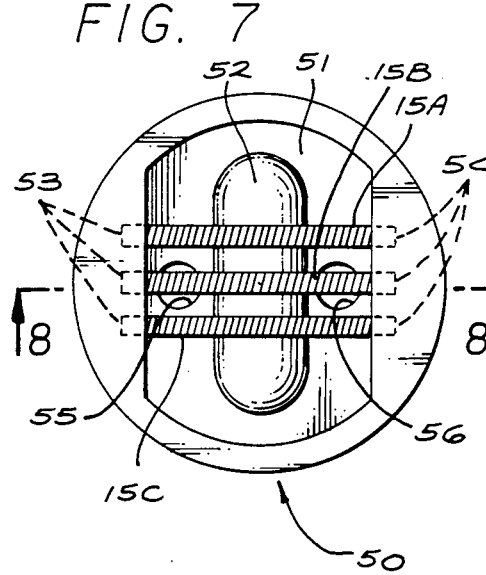
FIG. 8
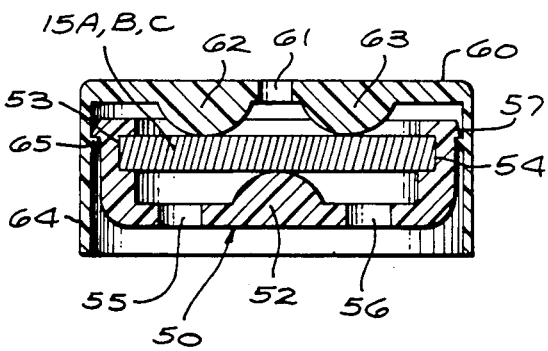
FIG. 9
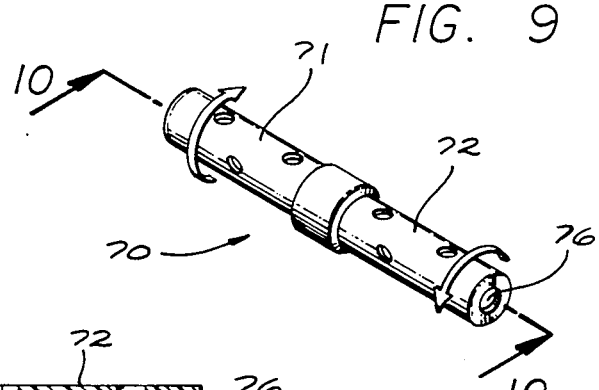
FIG. 10
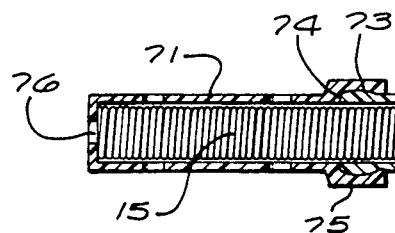

SUPERCOOLED LIQUID THERMAL GENERATOR AND IMPROVED TRIGGERING DEVICE

The phenomenon of a supercooled liquid confined within a container and subject to controlled crystalization to produce usable heat energy has been recognized for nearly 100 years. For close to 70 years, various types of devices including an enclosure, a supercooled liquid and some form of triggering device have been combined to produce a portable heat generator which is reusable.

It has been found that despite the 70 years of development, a continuing need exists for a truly effective yet simple, low cost triggering device. In early attempts to produce portable heat flasks or heat storage devices, a removable triggering device was used which was configured to carry a few drops of the supercooled liquid which promptly crystalized and then the removable crystal device would be reinserted into the enclosure with the crystals contacting the full body of the supercooled liquid with resultant crystallization and heat generation. These systems are typified by U.S. Pat. No. 1,433,010 to G. L. Hogan issued Oct. 24, 1922, and U.S. Pat. No. 1,915,523 to R. S. Ferguson issued June 27, 1933.

Other examples of triggering devices through the years are shown in U.S. Pat. No. 2,220,777 to D. F. Othmer issued Nov. 5, 1940 for a sealed leaf spring which is against the interior wall of a metal housing to trigger crystalization.

Forms of early triggering devices are shown in U.S. Pat. No. 2,289,45 to G. L. Hogan issued July 14, 1942 and U.S. Pat. No. 3,093,308 to C. D. Snelling issued June 11, 1963. This shows early use of dished metal disks as triggering devices.

In recent years various forms of dished metal triggering devices have been disclosed, most of which employ a variety of forms of slits or fissures either in the periphery or the interior. Examples of such triggering devices are shown in the following patents.
U.S. Pat. No. 4,077,390—Stanley et al—Mar. 7, 1978
U.S. Pat. No. 4,379,448—Kapralis et al—Apr. 12, 1983
U.S. Pat. No. 4,460,546—Kapralis et al—Apr. 17, 1984
U.S. Pat. No. 4,572,158—M. F. Fiedler—Feb. 25, 1987.

The variety of these recent triggering devices has been promoted largely because of the need to have a reliable triggering device and one which is not subject to false triggering. Also, an objective has been to make a triggering device of minimum cost.

BRIEF DESCRIPTION OF THE INVENTION

Faced with this state of the art, we were determined that it was possible to produce a triggering device which was simple to manufacture, effective in triggering the crystallization and heat production of supercooled liquids and which was relatively immune to false triggering. In the process, we developed a wide variety of triggering devices, most of which employ two pieces of metal which engage each other to produce the triggering effect. In certain of the case, they were dome shaped disks of a variety of shapes. Also, we attempted to make devices which employed openings other than the typical fissures present in most of the recently developed triggering devices. We also examined a pair of coaxial springs in a commercial device which were counter wound in a way so that deformation of the springs cause interaction between the two springs similar to the rubbing effect between a spring and a rod disclosed in U.S. Pat. No. 1,915,523.

It occurred to us that the art had grown to overcomplicate the problem through all these complex structures and the introduction of fissures or other artificial openings. We also were of the opinion that the practice of having two separate members as in the case of coaxial springs was unnecessary and in fact could well lead to false triggering.

In our experimentation, we discovered that a single, closely packed helical spring constitutes the ideal triggering device for suitable liquids. A helical spring by its very shape, having a hollow interior, allows the fluid to thoroughly permeate its structure. When closely packed, the spring presents a continuous line of contact between adjacent turns in which the length of the line of the contact is several times greater than the overall length of the spring. This allows the spring to be relatively small in size. We have also discovered that a close packed helical spring is an ideal structure for distortion from the side through the wall of an enclosure similar to the actions of breaking a match stick. A simple helical spring also exhibits a good degree of mobility within the enclosure so it has less likelihood, even when unprotected, to be triggered unintentionally. We experimented with numerous materials and found that type 300 series and 400 series stainless steel is an extremely stable material and one which works effectively as a triggering device. Beryllium, copper and phosphor bronze springs may be used. Also, titanium provides a light, effective spring.

For those who have concern about false triggering, we have developed a button like enclosure for the spring which allows free passage of the fluid in and around the spring and by pressing opposite sides of the button-like enclosure, the spring is distorted and the supercool liquid triggered.

In another embodiment, for those who might question the reliability of the spring as a triggering device, it employs two or three springs in parallel relationship with each distorted by pressing the opposite walls of the trigger housing.

Another simple embodiment of a helical spring is one in which the helical spring is captured within a cylindrical housing made up of two parts which are somewhat flexible. Employing this embodiment triggering is produced by twisting the opposite ends of the housing in opposite directions.

Although frusto-conical springs have been used for the resilient purpose in a previous triggering device as shown in FIG. 11 of the Othmer U.S. Pat. No. 2,220,777, we have found that the helical spring without the rubbing tail of Othmer can be employed as a trigger when the turns are cause to rub against each other upon depression. This eliminates the need for any rubbing tail. Such an embodiment is also effective when enclosed within a trigger housing with means for compressing the spring.

In accordance with another embodiment of our invention, a closed loop helical spring is positioned to be distorted by expansion about a conical holder to produce triggering.

BRIEF DESCRIPTION OF THE DRAWING

The foregoing invention may be more clearly understood from the following detailed description and by reference to the drawing in which:

FIG. 1 is a perspective view of a heat pack employing a triggering device of this invention;

FIG. 2 is an enlarged fragmentary perspective view of the near corner of the heat pack of FIG. 1 with the corner pouch sectioned to show the triggering spring therein;

FIG. 3 is a perspective view of a trigger housing which may be used to enclose the spring trigger of FIGS. 1 and 2;

FIGS. 4 and 5 are diametrical sectional views of the trigger housing of FIG. 3;

FIG. 6 is a vertical sectional view along line 6—6 of FIG. 4;

FIG. 7 is a top plan view of a three spring embodiment base with the cover removed;

FIG. 8 is a vertical sectional view of a completed assembly of the type shown in FIG. 7 taken along a line corresponding to line 8—8 of FIG. 7;

FIG. 9 is a perspective view of another embodiment of this invention;

FIG. 10 is a vertical sectional view of the embodiment of FIG. 9 taken along line 10—10 of FIG. 9;

DETAILED DESCRIPTION OF THE INVENTION

Figure 11:
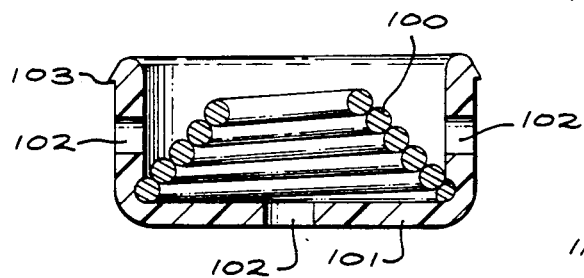
FIG. 11 is a vertical diametrical section of the base of a further embodiment of this invention.

Now referring to FIG. 1, a portable heat generating pad generally designated 10 is shown as including an outer flexible plastic cover 11, heat sealed at its edge 12 to provide a flexible pack, in the example given, approximately four inches by four inches by one-half inch in size. Other sizes of such pads are possible in varying configurations for various uses as an encircling portion of the body to apply localized heat or any of a large variety of other shapes. For purposes of description of this invention, a simple rectangular pad 10 is sufficient. A portion of the cover 11 is broken away to show the interior which is a material 13 such as sodium acetate which exhibits the property of being supercooled at room temperature and the property of conversion upon being triggered from a liquid to a polycrystaline state with heat energy given off during crystalization. The cover 11 is preferably of almost any flexible plastic material such as polyethylene provided it is liquid impermeable and undamaged by heating temperatures in the 220 degree F. range.

Note that three additional heat seal segments 14 are used to partially segregate one corner of the pad 10 from the rest but allowing free movement of the medium 13 between the corner and the remainder of the pad 10. In FIG. 1 and better shown in FIG. 2 is a triggering device 15 located in the segregated corner 16. The triggering device 15 is actually visible through the cover 11, if it is transparent and when the material 13 is in its liquid state. Whether visible or not, the triggering device 15 may be felt in the corner 16 by placing the thumb and fore finger on top and below the corner 16.

The triggering device 15 is a closely wound (turns in contact) hollow helical spring. Typical dimensions for a stainless steel spring are ⅛ inch outside diameter, length ½ inch, wire size 0.031 with approximately 32 turns per inch. The spring needs to have sufficient stiffness to maintain its shape and sufficiently resilient to allow binding by the application of pressure by the fingers through the cover 11. The hollow interior of the spring 15 allows free mobility of the material 13 throughout its interior and is in intimate contact with the individual turns with the possible exception of the line contact between adjacent turns of the spring 15. The spring 15 exhibits an ideal shape for triggering since the thumb, being slightly larger than the forefinger, or the thumb opposed to the forefinger and index finger, will allow the spring to be flexed through the exterior cover 11 and produce reliable triggering.

As indicated above, a number of the prior art triggering devices have suffered from a tendency to falsely trigger if the pad is dropped on the corner or is unintentionally compressed in that area. We have not encountered this to be a problem in the case of helical spring elements as shown in FIGS. 1 and 2. However, in case of concern about such false triggering, in FIGS. 3-5, we illustrate a trigger housing 20 which eliminates the danger of false triggering. In that case, the trigger housing 20 comprises a snap-on cover 21 and a base 22. The snap-on cover 21 includes a plurality of holes 23 allowing the entrance of the medium 13 of FIGS. 1 and 2 into the interior. Cover 21 includes a boss 24 which is positioned over the trigger spring 15 as shown in FIGS. 4 and 5. The base 22 includes a pair of bosses 25 and 26 in the bottom wall directed upward toward the spring 15. Preferably the bosses 24, 25 and 26 are spaced in the order of 0.001 inch from the spring and not in contact with the spring 15 under normal conditions. The trigger enclosure 15 and its trigger spring are located in the corner 16 in place of the exposed spring 15 of FIGS. 1 and 2 or may be allowed to flow within the interior of the pad 10 where it is visible and reachable for triggering.

A definite positive pressure applied to opposite sides of the enclosure 20 produces deformation of the spring 15 as illustrated in FIG. 5 and reliable triggering. False triggering cannot occur unless the force is sufficient to actually distort the cover 21 or the base 22 sufficiently for them to in turn distort the spring 15. It should be noted that the ends of spring 15 rest in recesses 30 and 31 at opposite sides of the trigger housing so that in its rest state, the spring is restrained within the housing 20 but the housing 20 is free to move about within the pad 10. Since sodium acetate or a comparable supercooled fluid is used, it will have a consistency when supercooled of water or glycerine, the highly mobile trigger housing 20 is unlikely to be triggered inadvertently since it can merely move out of the way of random pressure applied to the pad 10.

Where there is concern about the effectiveness of triggering by a single spring, the embodiment of FIGS. 7 and 8 is believed to be an example of how to employ a helical spring but in multiple units to be triggered by pressure on all three springs at the same time. This is illustrated in FIGS. 7 and 8 wherein there is a trigger housing base 50 having an internal cavity 51 and an elongated boss 52. A plurality of recesses, for example three recesses 53 at one end and mating recesses 54 on the opposite end, hold opposite ends of three springs 15A, 15B and 15C in side by side parallel relationship above the boss 52. The base 50 in this case can be of rigid material and includes a pair of openings 55 and 56 to allow the entrance of the surrounding medium of FIGS. 1 and 2.

Overlying the base 50, as may be seen in FIG. 8, is a cover 60 likewise having an opening 61 for the entrance of a supercooled liquid and a pair of bosses 62 and 63, each of which are elongated like boss 52 but spaced apart to define a three point pressure applying system when the base 50 and cap 60 are compressed. Note that cap 60 includes a side wall or skirt 64 which extends below the bottom of the base 50. Therefore, base 50 rests within a surrounding protective ring. Any pressure applied, for example, from a table top, to the bottom edge of the skirt 64 and one applies pressure to the top of cover 60, triggering will not occur because of the recessed nature of the base 50. Positive pressure between the upper surface of the cover 60 and the under surface of base 50 is necessary to trigger the springs 15A-C. Since no deflection in the structure is necessary, the embodiment of FIGS. 7 and 8 is preferred for applications in which the pad may be subject to rough treatment. Note also that the skirt 64 includes a ring detent or tapered ledge 65 which engages an outer rim 57 of the base 50 to snap lock the base 50 and cover 60 together in assembly.

We have also found it possible to trigger a closely wound helical spring when the spring is twisted axially. This may be accomplished in the embodiment of FIGS. 1 and 2, however the natural tendency seems to be to bend the spring as described above in connection with FIGS. 1 and 2. Twisting the spring for triggering can be accomplished by employing the assembly of FIGS. 9 and 10 wherein the spring 15 is enclosed within a two part trigger enclosure 70 including snap together parts 71 and 72, each of which have openings therethrough to allow the free movement of the supercoolable material into the housing 70. Inadvertent triggering of the spring of 15 of FIGS. 9 and 10 is extremely difficult to have occur because of its protection by the housing 70. Assembly is simple with the spring 15 introduced into the housing part 72 with one end extending outward. The housing part 71 is then slid over spring 15 and snapped over detent 73 of part 72. A mating recess 74 in an a collar 75 provides a snapped fit assembly. End holes 76 allow free movement of the supercoolable material 13 of FIGS. 1 and 2 into the interior of spring 15.

When it is desired to trigger a pad 10, one grasps the corner section with the thumb and forefinger of each hand, grasping through the cover wall 11 the rod-like enclosure 70. Squeezing the side wall of the enclosure parts 71 and 72 grasps the spring 15. Twisting the halves 71 and 72 relative to each other produces triggering of the supercooled liquid.

Figure 12:
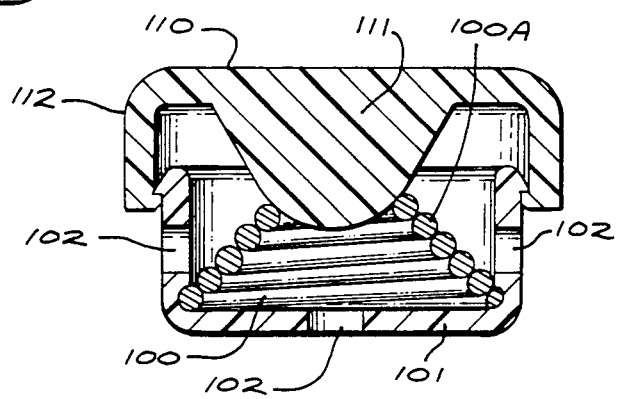
FIG. 12 is a vertical diametrical sectional view of a completed embodiment corresponding to the base of FIG. 11.

Another form of helical spring 100 is illustrated in FIG. 11 in a hollow cup-like base 101 with a fluid access opening 102. The base includes a skirt wall with a detent ring 103 over which rides a cover 110 of FIG. 12. The cover 110 includes a boss 111 which rests over or engages the upper turn 100A of the spring 100. The turns of spring 100 are normally in contact. The application of pressure between the lower surface of the base 101 and the top of the cover 110 forces the boss 111 to engage the spring and distort it outwardly to produce triggering. Similar to the close wound straight helical spring of FIGS. 1-10, the helical spring 100 has line contact between adjacent turns as is clearly visible in FIGS. 11 and 12. This property plus intimate contact with the supercooled material and the large surface area which is subject to the triggering action insures reliable triggering of the entire fluid body. Although as shown in FIGS. 11 and 12, the skirt portion 112 of the cover 110 does not extend below the lower surface of the base 101, such a feature similar to the embodiment of FIGS. 7 and 8 may be provided as further protection against false triggering.

Figure 13:
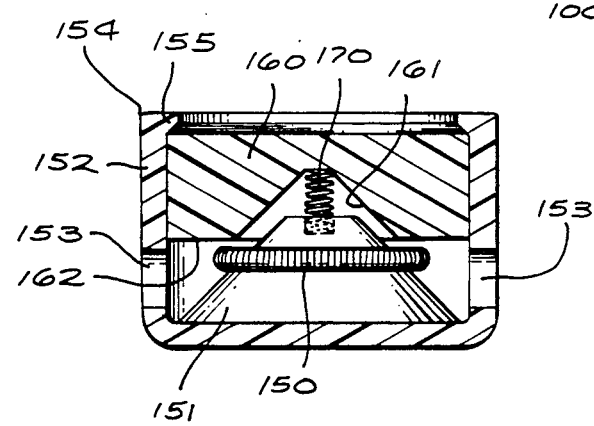
FIG. 13 is a vertical diametrical sectional view of still one further embodiment of this invention in its normal at rest condition.
Figure 14:
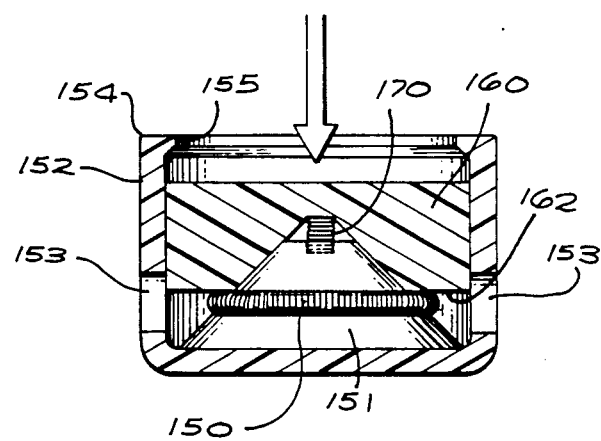
FIG. 14 is a similar view of the view of FIG. 13 when actuated.

An effective trigger may also be produced employing a continuous coil close packed helical spring 150 as shown in FIGS. 13 and 14. Such a spring encircles a frusto-conical boss 151 in cup 152 which has a plurality of openings 153 to allow the ingress of the supercooled liquid. An edge rim 154 includes an inwardly extending lip 155 which holds a snapped in cover 160 in place having a matching conical recess 161. The lower surface 162 of the cover 160 is positioned to engage spring 150 when the cover 160 is depressed to a lower position as shown in FIG. 14. The spring 150 is expanded by the surface 162 as it moves downward and triggering occurs. When pressure is released after triggering, the cover 160 is returned to its at-rest position by return spring 170. This embodiment also provides protection from inadvertent triggering. In each of the embodiments of FIGS. 3-14, the trigger enclosures are preferably injection molded plastics such as polyvinyl chloride or acrylonitrile-butadiene-styrene (ABS).

Altogether we have discovered that one of the simplest forms of one piece mechanical structures, the close packed helical spring acts as an effective trigger for supercooled liquid heat generating devices and exhibits a high degree of immunity from false triggering. Additionally, the cost of manufacture as compared with previous triggering devices is reduced. Multiple springs may be reduced and the spring may be enclosed within two part preferably plastic housings to allow triggering only by positive intended pressure or by twisting.

The foregoing constitutes a disclosure of the best mode known to us for carrying out this invention but is by no means limited to the embodiments illustrated. The scope of this invention is instead determined from the following claims and their equivalents.

What is claimed is:

1. A self contained manually triggerable thermal energy pack comprising:
   a flexible enclosure;
   a material within said flexible enclosure exhibiting the properties of remaining in a liquid state until triggered to being crystallization;
   trigger means within said enclosure;
   said trigger means comprising a unitary close turn helical metallic spring having sufficient stiffness to maintain its generally cylindrical shape and sufficient resiliency to allow bending by the application of manual pressure normal to its axis to spaced portions along its length through the flexible container.

2. A self contained manually triggerable thermal energy pack in accordance with claim 1 wherein said trigger means is of ferrous metal.

3. A self contained manually triggerable thermal energy pack in accordance with claim 1 wherein said trigger means is of stainless steel.

4. A self contained manually triggerable thermal energy pack in accordance with claim 1 wherein said trigger means is of titanium.

5. A self contained manually triggerable thermal energy pack in accordance with claim 1 including an enclosure for said spring;

said enclosure including portions therein engagable with spaced sections of said spring to distort said spring upon the application of manual pressure to said spring through the flexible enclosure.

6. A self contained manually triggerable thermal energy pack in accordance with claim 5 wherein said enclosure includes at least one manually deflectable wall.

7. A self contained manually triggerable thermal energy pack in accordance with claim 5 wherein said enclosure includes a pair of nestable parts and wherein said parts are relatively movable to apply distorting pressure to said spring.

8. A self contained manually triggerable thermal energy pack in accordance with claim 7 wherein one of said nestable parts includes a skirt portion extending beyond the other of said nestable parts and protects the other of said nestable parts from movement except for pressure applied within said skirt portion.

9. A self contained manually triggerable thermal energy pack in accordance with claim 5 wherein said engagable portions of said enclosure comprise a plurality of spaced internal bosses adjacent to said spring.

10. A self contained manually triggerable thermal energy pack in accordance with claim 8 wherein said trigger enclosure bosses include at least one boss on opposite sides of said spring.

11. A self contained manually triggerable thermal energy pack in accordance with claim 5 wherein said spring comprises a plurality of springs.

12. A self contained manually triggerable thermal energy pack in accordance with claim 5 wherein said enclosure includes at least one opening therein for the movement of said material into said enclosure in contact with said spring.

* * * * *